US012683700B2

(12) United States Patent
Churan

(10) Patent No.: US 12,683,700 B2
(45) Date of Patent: Jul. 14, 2026

(54) SYSTEMS AND METHODS FOR ENHANCED 2-RAY FADING

(71) Applicant: AURA Network Systems, Inc., McLean, VA (US)

(72) Inventor: Gary George Churan, Annandale, VA (US)

(73) Assignee: AURA Network Systems, Inc., McLean, VA (US)

( * ) Notice: Subject to any disclaimer, the term of this patent is extended or adjusted under 35 U.S.C. 154(b) by 35 days.

(21) Appl. No.: 19/036,895

(22) Filed: Jan. 24, 2025

(65) Prior Publication Data

US 2025/0240108 A1      Jul. 24, 2025

Related U.S. Application Data

(60) Provisional application No. 63/624,725, filed on Jan. 24, 2024.

(51) Int. Cl.
H04B 17/309 (2015.01)
(52) U.S. Cl.
CPC .................................. H04B 17/347 (2023.05)
(58) Field of Classification Search
CPC .................................................... H04B 17/347
See application file for complete search history.

(56) References Cited

U.S. PATENT DOCUMENTS

| | | | |
|---|---|---|---|
| 9,622,133 B1 * | 4/2017 | Guvenc | ................ H04W 36/20 |
| 11,756,432 B2 * | 9/2023 | Neubauer | ................ G08G 5/76 |
| | | | 701/3 |

FOREIGN PATENT DOCUMENTS

WO      WO-2025152552 A1 *    7/2025    ........... H04B 17/391

OTHER PUBLICATIONS

Machine translation of WO-2025152552-A1 (Year: 2025).*
Zhu et al, "A general altitude-dependent path loss model for UAV-to-ground millimeter-wave communications", Frontiers of Information Technology & Electronic Engineering (Year: 2021).*

* cited by examiner

*Primary Examiner* — Kenneth M Dunne
(74) *Attorney, Agent, or Firm* — Kubota & Basol LLP

(57)      ABSTRACT

Disclosed herein are systems and methods of predicting fading loss of signals transmitted between a ground-based transceiver and an aircraft based upon a two-ray fading model that incorporates elevation information of an environment. Some examples of the disclosure are directed to determine fading loss using a plurality of geofences that are determined based on a plurality of planar shapes.

16 Claims, 7 Drawing Sheets

600

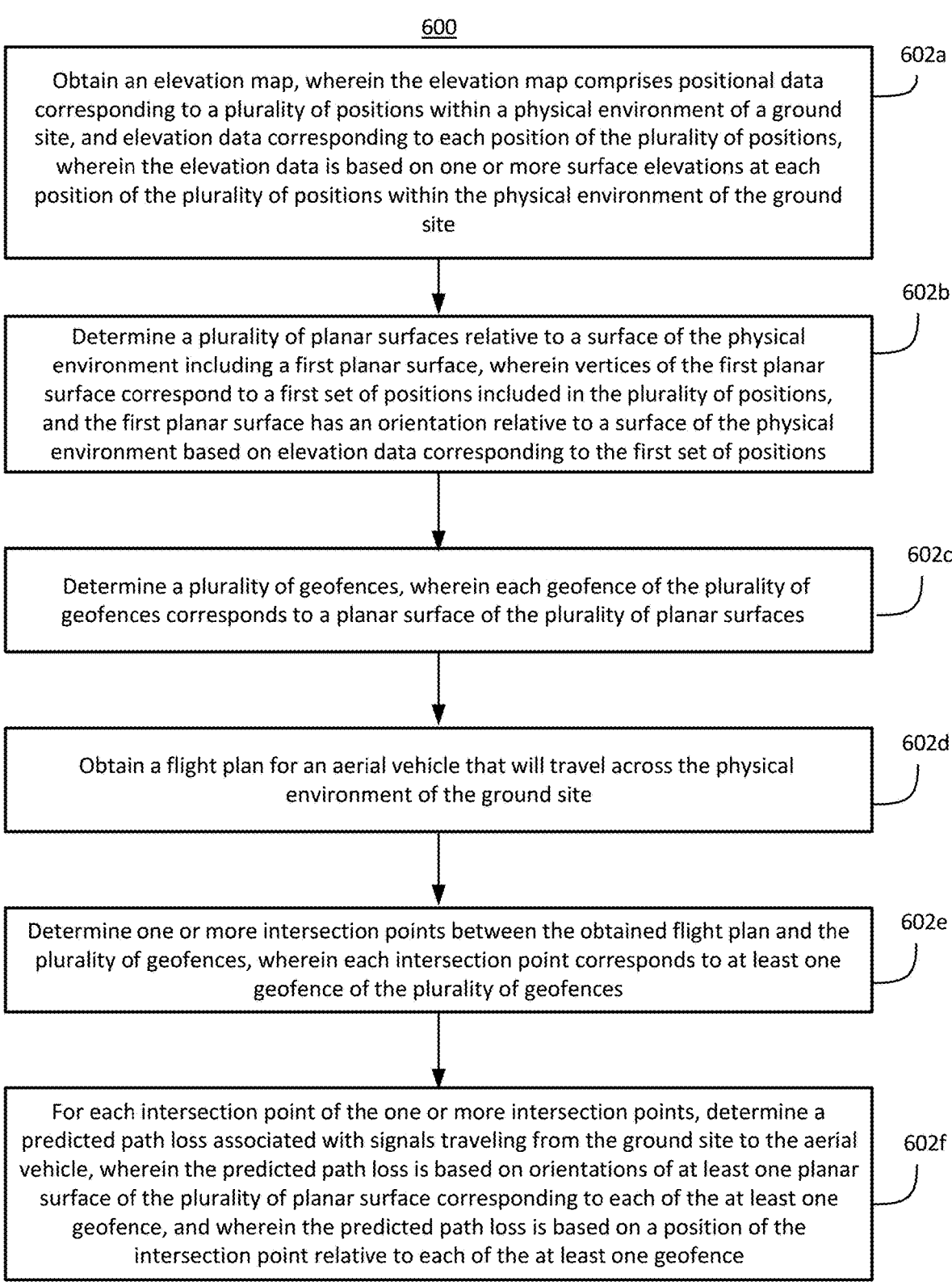

602a

Obtain an elevation map, wherein the elevation map comprises positional data corresponding to a plurality of positions within a physical environment of a ground site, and elevation data corresponding to each position of the plurality of positions, wherein the elevation data is based on one or more surface elevations at each position of the plurality of positions within the physical environment of the ground site 602b Determine a plurality of planar surfaces relative to a surface of the physical environment including a first planar surface, wherein vertices of the first planar surface correspond to a first set of positions included in the plurality of positions, and the first planar surface has an orientation relative to a surface of the physical environment based on elevation data corresponding to the first set of positions 602c Determine a plurality of geofences, wherein each geofence of the plurality of geofences corresponds to a planar surface of the plurality of planar surfaces 602d Obtain a flight plan for an aerial vehicle that will travel across the physical environment of the ground site 602e Determine one or more intersection points between the obtained flight plan and the plurality of geofences, wherein each intersection point corresponds to at least one geofence of the plurality of geofences 602f For each intersection point of the one or more intersection points, determine a predicted path loss associated with signals traveling from the ground site to the aerial vehicle, wherein the predicted path loss is based on orientations of at least one planar surface of the plurality of planar surface corresponding to each of the at least one geofence, and wherein the predicted path loss is based on a position of the intersection point relative to each of the at least one geofence

FIG. 6

SYSTEMS AND METHODS FOR ENHANCED 2-RAY FADING

CROSS REFERENCE TO RELATED APPLICATIONS

This application claims the benefit of U.S. Provisional Application No. 63/624,725, filed Jan. 24, 2024, the content of which is herein incorporated by reference in its entirety for all purposes.

FIELD

The present disclosure relates generally to systems and methods for estimating fading loss associated with signals transmitted between a ground-based transceiver and an airborne vehicle transceiver.

BACKGROUND

Operating unmanned aerial vehicles beyond visual light of sight requires careful allocation of communication resources to ensure that an aircraft always has access to a quality communication link between the aircraft and one or more ground transceivers. Accurately modeling the communication link between an aircraft and a ground-based transceiver can minimize and/or avoid disruptions to flight operations associated with an inconsistent or poor performing communications link.

SUMMARY

Disclosed herein are systems and methods for estimating signal losses based upon topographic features of an environment. In one or more examples, a system for tracking the location of one or more unmanned aerial vehicles (e.g., UAVs) flying within a given geographic area includes one or more ground-based transceivers that are distributed throughout the geographic area. In some examples, each transceiver is communicatively coupled to a common controller that is configured to coordinate operation of the system. In one or more examples, the common controller causes each of the ground-based transceivers to transmit signals that are received by one or more aircraft flying within the geographic coverage area of the system.

In one or more examples, the common controller models signal fading of signals communicated from the ground-based transceivers to the one or more aircraft. In one or more examples, the signal fading includes estimating multipath distortion caused by signals transmitted between ground-based transceivers (ground station) and airborne transceivers that reflect off of the surface of the earth before being received at the receiving terminal antenna. In some examples, the fading is simulated using a two-ray fading model. In one or more examples, the fading model uses location information (e.g., geographic coordinates such as latitude, longitude) including elevation information (e.g., elevation data) to estimate a topography of the surface of the earth at various locations between the ground station and the planned flight path of the one or more aircraft. In one or more examples, the model further includes determining a plurality of geofences (e.g., a virtual geographic boundary defined by global positioning information) corresponding to the plurality of planar surfaces and/or contours created by the fading model that simulate the terrain height variations along the planned flight path. In one or more examples, the plurality of geofences are upward projections of the plurality of planar surfaces and/or contours toward a planned elevation of an aircraft moving in accordance with a planned flight. In one or more examples, the model includes determining the intersection between the planned flight of the one or more aircraft and projections of the plurality of geofences. In one or more examples, the model includes determining one or more predicted path losses for one or more intersections between the planned flight of the one or more aircraft and projections of the plurality of geofences. In one or more examples, the common controller allocates communication resources in accordance with the predicted path losses generated using the model.

BRIEF DESCRIPTION OF THE FIGURES

The invention will now be described, by way of example only, with reference to the accompanying drawings, in which:

FIG. 6 illustrates an example method of determining path loss in accordance with elevation information according to one or more examples of the disclosure.

DETAILED DESCRIPTION

Figure 1:
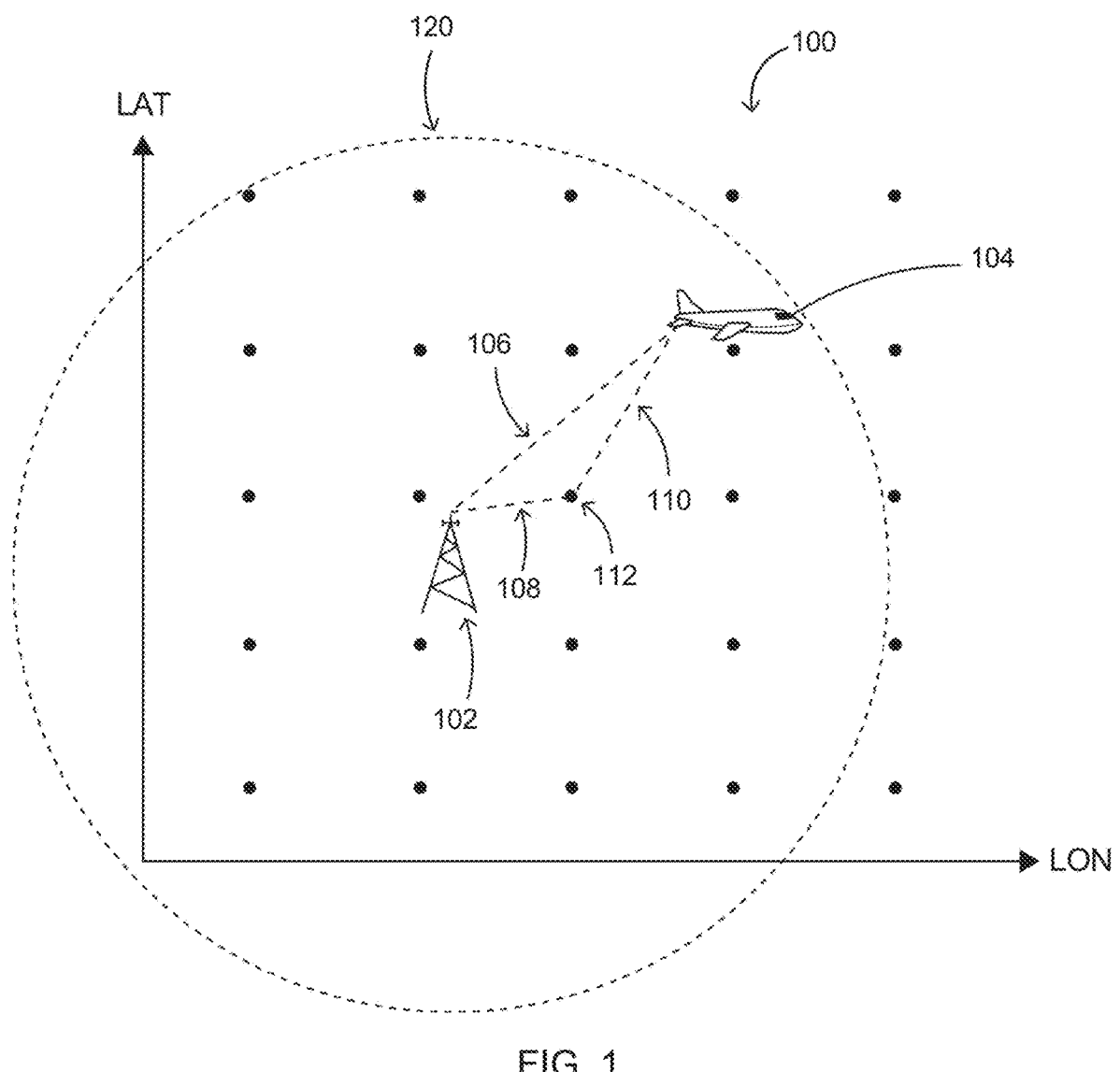
FIG. 1 illustrates an exemplary aircraft communication environment according to one or more examples of the disclosure.

Reference will now be made in detail to implementations and examples of various aspects and variations of systems and methods described herein. Although several exemplary variations of the systems and methods are described herein, other variations of the systems and methods may include aspects of the systems and methods described herein combined in any suitable manner having combinations of all or some of the aspects described. Throughout this disclosure the word 'plane' can denote a geometric surface while the word 'aircraft' can denote an airborne vehicle.

Disclosed herein are systems and methods for estimating received signal fading variations (gains and losses) due to topographic features of an environment. In one or more examples, a system for tracking the location of one or more UAVs flying within a given geographic area includes one or more ground-based transceivers that are distributed throughout the geographic area. In some examples, each transceiver is communicatively coupled to a common controller that is configured to coordinate operation of the system. In one or more examples, the common controller causes each of the ground-based transceivers to transmit signals that are received by one or more aircraft flying within the geographic coverage area of the system.

In one or more examples, the common controller models signal fading of signals communicated from the ground-based transceivers to the one or more aircraft. In one or more examples, the signal fading includes estimating multipath distortion caused by signals transmitted from the ground-based transceivers that reflect off one or more locations of the surface of the earth before being received at an airborne transceiver of a UAV. In some examples, the fading is simulated using a two-ray fading model applied to each of the one or more reflected signal paths. In one or more examples, the fading model uses location information (e.g., geographic coordinates such as latitude, longitude) including elevation information (e.g., elevation data) to estimate a topography of the surface of the earth at various locations corresponding to a planned flight path of the one or more aircraft. In one or more examples, the model further includes determining a plurality of geofences corresponding to the plurality of planes (e.g., planar surface elements that interconnect at their edges and vertices) and/or contours created by the fading model to conform to or model the terrain height variations along the planned flight path. In one or more examples, the model includes determining intersection between the planned flight of the one or more aircraft and projections of the plurality of geofences. In one or more examples, the model includes determining one or more predicted path losses for one or more intersections between the planned flight of the one or more aircraft and projections of the plurality of geofences. In one or more examples, the common controller allocates communication resources in accordance with the predicted path losses generated using the model.

In the following description of the various examples, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of one or more algorithms. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some examples also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems are described herein. In addition, the present invention is not described with reference to any particular programming language. It will be appreciated that a variety of programming languages may be used to implement the teachings of the present disclosure as described herein.

Current aircraft control technology can benefit from a continuous, or near-continuous communication link to ensure remote operators can maintain, continuously monitor, and control an aircraft. Although transmission power can be raised to improve reliability of a communication link, transmitting signals at a relatively higher power can cause network congestion and can require a transmitter transmitting the signal to consume large amounts of power. Thus, as part of providing a reliable communication signal between a ground station and an aircraft, transmission power must be balanced with spectral efficiency requirements when providing the communication link. The systems and methods described herein provide a mechanism for improving predictions of signal fading as compared to conventional approaches, thus improving communication resource optimization and reducing network congestion.

FIG. 1 illustrates an exemplary aircraft communication environment according to one or more examples of the disclosure. Exemplary environment 100 of FIG. 1 includes a system including a ground-based transceiver 102 included at a ground site configured for communication with an aircraft. In some examples, the environment 100 may contain additional or alternative ground-based transceivers, that can be in communication with other ground-based transceivers and/or aircraft. In some examples, ground-based transceiver 102 is configured to provide communication between a remote operator and aircraft 104, such as by communicating signals to one or more transceivers included in aircraft 104. As described further herein, it is understood that the ground-based transceiver 102 optionally is configured to communicate with aircraft 104 moving through an airspace corresponding to coverage area 120 of the environment 100. For example, the ground-based transceiver 102 can be configured to transmit and/or receive signals, data, and/or information to and from the aircraft 104 to control and/or modify the movement of aircraft 104. In some examples, communication resources including those associated with ground-based transceiver 102 are configured by a common controller that communicates with ground-based transceiver 102 to provide a continuous or near-continuous communication link while facilitating movement of the aircraft 104 flying through coverage area 120.

In some examples, the coverage area 120 is associated with additional or alternative ground-based transceivers also configured to communicate with aircraft 104 moving through coverage area 120, that are each similar to or the same as described with reference to ground-based transceiver 102. In some examples, coverage area 120 includes a portion of environment 100 within a line-of-sight (LOS) of the ground transceiver 102, an area bounded by the LOS of the ground transceiver 102, and/or a portion of environment 100 including and/or corresponding to a planned movement of aircraft 104 through environment 100. In some examples, the ground-based transceiver 102 can obtain location information (e.g., positional data) from another computing system and/or from memory included in a system in communication with ground-based transceiver 102 associated with environment 100. For example, the location information can include latitude, longitude, and/or elevation data associated with the environment 100 and/or coverage area 120. The dotted grid points in FIG. 1 can represent Lat/Lon locations where the terrain elevations are known, such as can be found in a publicly available terrain elevation database that forms an elevation map. As an example, location 112 within coverage area 120 is representative of a first physical location within coverage area 120. In some examples, ground transceiver 102 can request and receive, and/or determine a latitude, longitude, and an elevation of the surface of the earth and/or a surface object at location 112.

Some examples of the disclosure herein reference operations and/or logic performed by a ground-based or ground transceiver. It is understood that the operations and/or logic can additionally or alternatively be performed at least partially or entirely by the common controller described previously, and/or at additional or alternative ground-based transceivers. Additionally or alternatively, it is understood that some operations and logic can be performed by the common controller, and that the common controller can cause the ground-based transceiver(s) to perform additional operations and/or logic (e.g., adjusting communication resources) based upon commands and/or information communicated from the common controller.

In some examples, the common controller and/or the ground-based transceiver 102 receive and/or obtain location information (e.g., latitude, longitude, and/or terrain elevation data) corresponding to the location 112 from publicly available data sources (e.g., the United States Geological Survey and/or other published elevation data) prior to initiation of flight of aircraft 104 or while the flight of aircraft 104 is ongoing. In some examples, a common controller and/or ground-based transceiver 102 determines such location information (e.g., by interpolating and/or projecting previously obtained location information) and/or obtains the location information to determine latitude, longitude, and/or elevation data for portions of environment 100 including— but not limited to—coverage area 120.

In some examples, aircraft 104 is associated with a flight plan. The flight plan can include a route expressed in latitude, longitude, and/or elevation of aircraft 104 that the aircraft 104 will assume during its flight. In some examples, the ground-based transceiver 102 and/or the common controller can determine the flight plan of aircraft 104 in advance of the aircraft's flight and can facilitate the autonomous or semi-autonomous flight of aircraft 104 through the coverage area 120. It can be appreciated that to improve the cost, spectral efficiency, and/or continuity of autonomous or semi-autonomous flight of aircraft 104, a system that can accurately model predicted path losses of signals that are communicated to aircraft 104 during its flight is desired.

Path loss as referred to herein can refer to the attenuation of signals incurred when signals propagate from a transmitter to a receiver. Free-space path loss is one example, which can refer to signal attenuation that occurs naturally when electromagnetic waves propagate within free space. In some examples, path loss includes received signal fading due to reflections of transmitted signals in an environment, as described extensively herein. For example, a signal traveling directly from a ground-based transceiver to an aircraft is and a reflected copy of that signal (e.g., attenuated and/or time-delayed) are both received at a receiver of an aircraft. In some examples, the two signals combine constructively or destructively at a receiver in space. In some examples, the two signals combine constructively and/or destructively as the aircraft receiver flies through space, thereby changing received signal strength, possibly altering the statistical characteristics of information received (i.e. quality of service, QoS) at the aircraft 104. In some examples, the path loss is determined based on signal attenuation caused by the constructive and/or destructive combination of signals received at aircraft 104. It should be understood that the path loss effects and determinations described in these examples for the ground-to-air signal direction may also apply to the air-to-ground direction.

In some examples, a computing system including ground-based transceiver 102 and/or the common controller determines predicted path losses of one or more signals that can be transmitted from ground-based transceiver 102 to aircraft 104 during the movement of aircraft 104 through environment 100. In some examples, determining path loss can include one or more operations including obtaining location information of environment 100 and/or coverage area 120, determining a two-ray fading model using some or all of the location information, determining a predicted intersection between the aircraft 104 and signals propagating from ground-based transceiver 102 in view of the two-ray fading model, and determining one or more path losses of the signals propagating toward aircraft 104. In view of the predicted path losses, ground-based transceiver 102 and/or the common controller can preemptively and/or dynamically allocate communication resources to facilitate communication between ground-based transceiver 102 and aircraft 104 moving through coverage area 120 in accordance with a flight plan of aircraft 104. The aforementioned operations can improve accuracy of predicted path loss over conventional modeling solutions and reduce the amount of processing required to estimate such path loss, thereby reducing power consumption of communication systems, reducing computing time required to simulate path loss and adjust for erroneous predictions of path loss, and/or can improve allocation of communication resources required to facilitate movement of aircraft 104. For example, a common controller can generate a plurality of shapes representative of reflective patterns of signals that may reach the aircraft 104 as described further herein at least with reference to FIG. 3, and forgo simulation of path losses of signals reflecting from the surfaces of those shapes (planar surfaces) that will not reach a planned location of aircraft 104 based upon simulations associated with the plurality of planar surfaces, thereby reducing processing and computation required to simulate the path loss without determining the reflective attributes of the plurality of planar surfaces-. In particular, the examples described herein leverage elevation and/or ground slope information to more accurately identify potential signal fading that can degrade the communication link between ground-based transceiver 102 and aircraft 104 compared to conventional approaches.

As described previously, the ground transceiver 102 can facilitate movement of aircraft 104 by communicating with the aircraft 104 moving through coverage area 120. For example, ground transceiver 102 can communicate a first signal 106 (Line-Of-Sight) from the ground transceiver 102 to the aircraft 104, such that the signal 106 can be received by receiving circuitry included in the aircraft 104. Signal 106 can represent a signal carrying data, information, and/or instructions guiding the aircraft 104, providing telemetry information concerning the environment 100, providing telemetry information concerning a communication link between ground transceiver 102 and aircraft 104, and/or providing additional or alternative information that can be used to facilitate the flight of aircraft 104 in accordance with its flight plan.

As described further herein, the reflection signal 110 can represent an undesired or unintentional multipath interference caused by ground-based transceiver 102 transmitting electromagnetic waves into environment 100. In FIG. 1, second signal 108 is illustrative of a modeled, alterative path of signals transmitted by ground-based transceiver 102. For example, when transmitting the one or more signals to provide aircraft 104 with the information carried by signal 106, a radiation pattern of one or more antennas communicatively coupled to ground-based transceiver 102 may include transmission of signal 108, incident upon location 112 within coverage area 120. Signal 108 is optionally representative of an alternative path of the electromagnetic wave(s) transmitted by ground-based transceiver 102 when transmitting the first signal 106, modeled by a ray extending from the ground-based transceiver 102. In some examples, the second signal 108 reflecting from the environment 100 at location 112 can cause a third signal 110 to propagate away from the surface of environment 100, which can intersect with aircraft 104. Thus, as illustrated in FIG. 1, aircraft 104 can receive a direct signal (e.g., first signal 106) and can also receive one or more reflected signals (e.g., third signal 110) at a particular position along its flight path, thus potentially causing destructive interference and/or increased path loss of the received signal by attenuating the combination of signals. As an example, the path loss can undesirably degrade signal-to-noise ratio (SNR) of communication between ground transceiver 102 and aircraft 104, thereby degrading and/or severing the communication link between ground transceiver 102 and aircraft 104.

In some examples, to mitigate degradation of the communication link, ground-based transceiver 102 can determine predicted reflections of signals incident upon the surface of the earth and/or another elevation feature (e.g., a hill, a slope, a mountain peak, and the like) within the environment 100 so as to determine if a given communication link can be maintained with sufficient quality to maintain continuous communications during a flight. In some examples, ground transceiver 102 can thereafter determine potential distortion and fading (e.g., multipath distortion) caused by reflection signal 110 incident with aircraft 104. It is understood that reference to "reflection" of a signal is merely exemplary, and that scattering and diffraction of a signal incident upon a surface, and their effects exacerbating signal fading can be contemplated without departing from the scope of the disclosure. Additionally or alternatively, it is understood that a portion, or all, of the ground-based transceivers and/or the aerial transceiver optionally comprise a computing system. Additionally or alternatively, one or more of the ground-based transceivers can be understood as a first computing system, and one or more aerial transceivers included in aircraft 104 can be understood as a second computing system. Predicting reflections in accordance with the systems and methods described herein may allow networks including a base station and the aircraft to compensate for multipath fading, thereby reducing the need for the aircraft to include a plurality of antennas configured to implement diversity techniques. For smaller aircraft, there may not be enough room to place two or more antennas to improve received signal diversity and thereby mitigate 2-ray fading effects at UHF frequencies.

Figure 2:
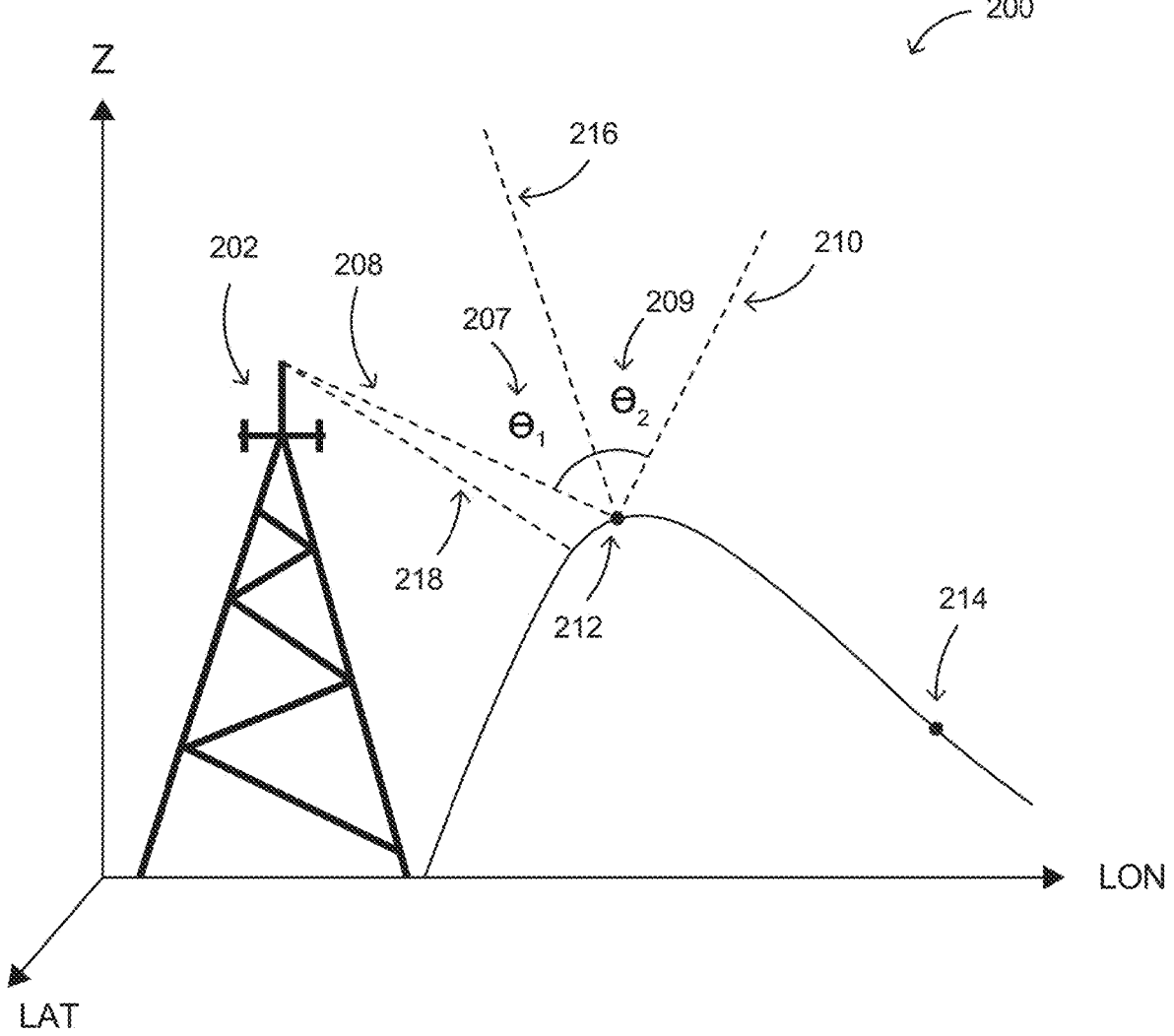
FIG. 2 illustrates a profile view of signals that are transmitted by a ground-based transceiver and incident upon a surface of an environment according to one or more examples of the disclosure.

FIG. 2 illustrates a profile view of signals that are transmitted by a ground-based transceiver and incident upon a surface of an environment 200 according to examples of the disclosure. In FIG. 2, ground-based transceiver 202 can have one or more characteristics similar or the same to those described with reference to ground-based transceiver 102. Additionally or alternatively, environment 200 can have one or more characteristics similar to or the same as those described with reference to environment 100, and location 212 can have one or more characteristics similar to or the same as those described with reference to location 112. In particular, ground-based transceiver 202 is illustrated transmitting signals 208 and 218, each having paths extending from ground-based transceiver 202 (e.g., from an elevation and/or location of the ground-based transceiver 202) to locations within the environment 200. Location 212, for example, can be associated with a first latitude, longitude, and elevation relative to the surface of the earth. For example, ground-based transceiver 202 and/or the common controller can obtain the first latitude, longitude, and elevation of location 212 when receiving location information associated with a coverage area of ground transceiver 202 and simulate an angle of incidence 207 and angle of reflection 209 of the signal 208 reflecting away from location 212 based upon the relative elevation, latitude, and/or longitude of location 212 relative to ground transceiver 202. In some examples, ground-based transceiver 202 (and/or the common controller communicatively coupled to ground-based transceiver 202) can determine an angle of reflection 209 of a reflected signal 210. As an example, the angle of reflection 209 equals the angle of incidence 207 of the signal 208, symmetric with respect to an axis 216 extending normal to the surface of the environment 200 at location 212 and extending towards the sky (e.g., along the "Z" axis illustrated in FIG. 2). Based upon the predicted angle of reflection 209, the common controller can predict an orientation of a reflection (e.g., relative to the latitude, longitude, and/or elevation information) of signal 208—corresponding to the path of reflected signal 210—and determine potential intersections between the reflected signal 210 and an aircraft traveling through environment 200, as described further with reference to FIGS. 3-6. As described previously, it is understood that the operations and/or logic can additionally or alternatively be performed at least partially or entirely by the common controller described previously, and/or at additional or alternative ground-based transceivers. Additionally or alternatively, it is understood that some operations and logic can be performed by the common controller, and that the common controller can cause the ground-based transceiver(s) to perform additional operations and/or logic (e.g., adjusting communication resources) based upon commands communicated from the common controller.

In some examples, ground-based transceiver 202 (and/or the common controller) determines that one or more locations within environment 200 will not cause a reflection of signals transmitted by ground-based transceiver 202 and forgoes performing operations associated with those one or more locations when modeling signal fading and/or excludes those locations from a signal fading model. For example, in FIG. 2, ground-based transceiver 202 determines a lack of line-of-sight between ground-based transceiver 202 and location 214, and consequentially forgoes modeling a reflection of the signals at location 214. For example, ground-based transceiver 202 determines that the elevation data corresponding to location 212 may physically block signal 218 from propagating from ground-based transceiver 202 toward location 214 (e.g., at the elevation, latitude, and longitude of environment 200 corresponding to location 214). As an example, a surface feature, hill, mountain, and/or building can be predicted to block a line of sight between ground-based transceiver 202 and location 214, such as the slope of a mountain peaking at location 212 in FIG. 2. Accordingly, the ground-based transceiver 202 optionally does not determine potential intersections between signals transmitted from ground-based transceiver 202 and the location 214, and therefore does not calculate or discards potential signal fading caused by signals incident upon location 214 within the environment 200. It is understood that the resolution of the location information such as the distance between location 212 and location 214 are merely exemplary, and that the elevation, latitude, and/or longitude included in the location information obtained by the common controller can be more densely or sparsely distributed with respect to environment 200 without departing from the scope of the disclosure.

It can be appreciated that the examples illustrating a direct path "ray" corresponding to signals 106, and a reflected path "ray" corresponding to signals 108 plus 110, and/or signals 208 plus 210, can be modeled, simulated, and/or evaluated to determine potential path losses caused by reflections at a first location within the environment. Thus, the examples described with reference to FIGS. 1-2 can be understood as a two-ray reflection and/or fading model predicting path loss between a ground transceiver 102 and an aircraft. In some examples, the ground transceiver 102 can simulate a plurality of reflections based upon the principles and operations illustrated and described with reference to FIGS. 1-2. The plurality of reflections can additionally or alternatively be modeled off of a plurality of planar surfaces, and/or contours between positions within an environment to computationally simplify determinations of potential interference caused by a plurality of reflection rays propagating from a plurality of locations within a coverage area of a ground transceiver 102. In one or more examples, the shapes, planar surfaces, and/or contours each have spatial profiles and/or orientations relative to the surface of the earth based upon the elevation information, as described further below.

Figure 3:
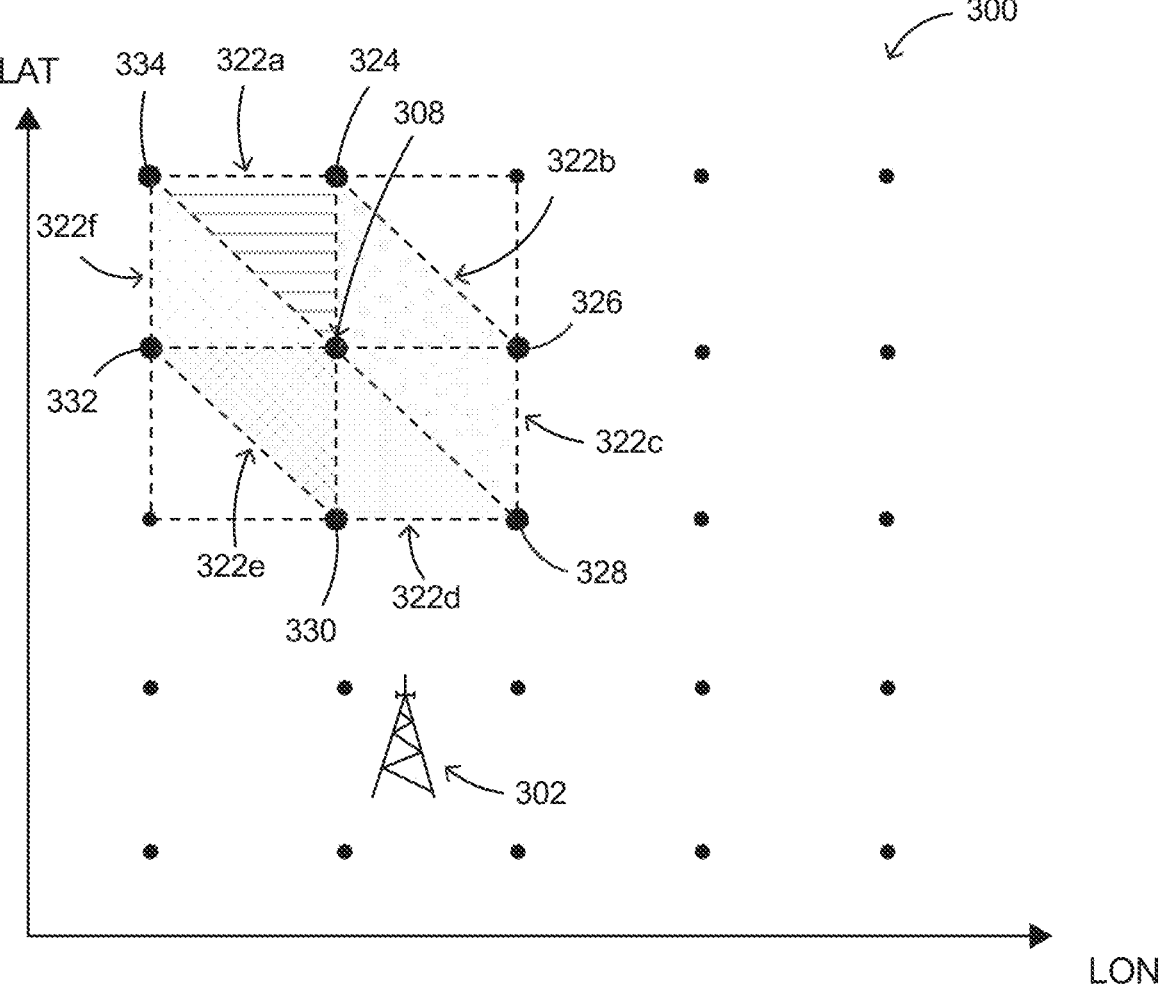
FIG. 3 illustrates a plurality of geofences indicative of a potential intersection between signals reflecting from the earth and reaching an aircraft according to one or more examples of the disclosure.

FIG. 3, in particular, illustrates a plurality of triangular shaped reflective planar surfaces 322a through 322f, (and their combinations) indicative of a potential intersection between signals reflecting from the earth off of the planar surface and an aircraft traveling through an environment in accordance with some examples of the disclosure. In some examples, the planar surface represents a portion of a geometric plane defined and bounded by the latitude, longitude, and elevation of its vertices that can be indicative of a reflection pattern of signals incident upon the region of environment 300. For example, planar surface 322a is defined and bound by the vertices at locations 308, 324, and 334, as described further with reference to FIGS. 4-5. Described an additional way, the projected outline of the planar surface toward the sky can be understood as a "geofence" that defines a geographical area through and/or over which an aircraft can move. For example, ground transceiver 302 can simulate a ray that intersects with the physical environment at location 308 and reflects along a ray reflection path proceeding both upward and laterally from location 308. In some examples, ground transceiver 302 can generate a geofence by projecting those rays onto a plane that is parallel to the surface of the earth and at an altitude corresponding to the planned elevation of an aircraft. In some examples, the vertices of the geofence correspond to where each reflected ray intersects with the elevated plane. It is understood that the location information associated with each location depicted in FIG. 3 can be the same as or similar to the location information described with reference to FIG. 2.

In FIG. 3, shape 322a corresponds to a triangular planar surface having vertices corresponding to latitudes, longitudes, and elevations defined by location information that corresponds to location 308, location 324, and location 334. Planar surface 322a can be a simulated two-dimensional shape (e.g., a planar shape), and as such can have an orientation relative to the surface of the environment 300 that is defined by the elevation of location 308, location 324, and location 334. For example, when each location comprising a vertex of planar surface 322a are a same elevation, the planar surface 322a can be parallel (or nearly parallel) to the surface of the earth. When the elevation of vertices of the planar surface 322a are not the same, the orientation of planar surface 322a can be skewed relative to the surface of the earth, and thereby can be oriented non-parallel with respect to the surface of the earth.

Additionally in FIG. 3, planar surface 322b comprises vertices defined by location information corresponding to location 308, location 324, and location 326. In some examples, planar surface 322b has an orientation relative to a surface of environment 300 determined in accordance with elevation information corresponding to the vertices of planar surface 322b. In some examples, ground transceiver 302 determines rays incident upon particular locations corresponding to the vertices of planar surface 322b, simulates reflection between the vertices, and thus determines a planar surface 322b similar to as described with reference to planar surface 322a. Thus, the ground transceiver 302 can determine (e.g., simulate) a plurality of planar surfaces each having an orientation relative to a surface of environment 300, the orientation defined by and/or corresponding to location information including elevation information of vertices of each planar surface, similar to as described with respect to planar surface 322a.

In some examples, the operations and/or logic described with reference to planar surfaces 322a and 322b are repeated to simulate a plurality of planar surfaces in a coverage area. For example, ground transceiver 302 can calculate one or more simulated planar surfaces or contours for each set of adjacent locations within environment 300 and/or within a coverage area of environment 300. In one or more examples, the operations associated with the simulation of planar surfaces and/or contours are performed at one or more other devices than in addition to or in the alternative to at ground transceiver 302, such as a common controller device configured to communicate with a plurality of base stations to coordinate and facilitate flight of an aircraft. The common controller may also be embodied by cloud-based software. In FIG. 3, six planar surfaces sharing a vertex corresponding to location 308 are illustrated: planar surface 322a, planar surface 322b, planar surface 322c, planar surface 322d, planar surface 322e, and planar surface 322f. It is understood that the planar surfaces may not share one or more vertices, and that such description is merely exemplary. In some examples, the aforementioned planar surfaces have vertices that are adjacent locations; the planar surface 322c is determined relative to the location information of location 308, location 326, and location 328, the planar surface 322d is determined relative to the location information of location 308, location 328, and location 330, the planar surface 322e is determined relative to the location information of location 308, location 330, and location 332, and the planar surface 322f is determined relative to the location information of location 308, location 332, and location 334. As described previously, the orientation of each planar surface corresponds to elevation of the vertices (e.g., locations) that define each planar surface. In some examples, the determination of similar planar surfaces, and orientations of the similar planar surfaces relative to the earth's surface are determined for some or all locations included in a coverage area of the ground transceiver 302. For example, six planar surfaces sharing a vertex corresponding to location 326 can be determined, each planar surface having an orientation relative to the earth's surface, similar to or the same as described with reference to the six planar surfaces determined relative to location 328. It is understood that the ground transceiver 302 can omit determination of planar surfaces that have been previously simulated, such as planar surface 322b and planar surface 322c when determining reflection angles relative to location 326. In some examples, ground transceiver 302 repeats the simulation of the planar surfaces for each location included in the coverage area, or a subset of the locations that are relevant to a flight plan. In some examples, a continuous three-dimensional (3D) spline-fit interpolation can be constructed where the ray reflection angle at any target location on the terrain surface is approximated as a weighted function of all nearby database points. This approach could improve the calculation fidelity by using multiple layers of nearby grid points rather than just the vertices of the nearest triangle.

The triangular shape of the planar surfaces determined by the ground transceiver 302 reduce the computational load required by one or more processors determining the two-ray fading simulation that are included in and/or in communication with the ground transceiver 302, thus reducing power consumption and processing time required to estimate fading losses of signals reaching an aircraft. For example, the common controller can simulate an accurate set of signal reflections within the environment using an orientation of a particular planar surface without requiring simulation of reflections at each location bound by the particular planar surface.

Figure 4:
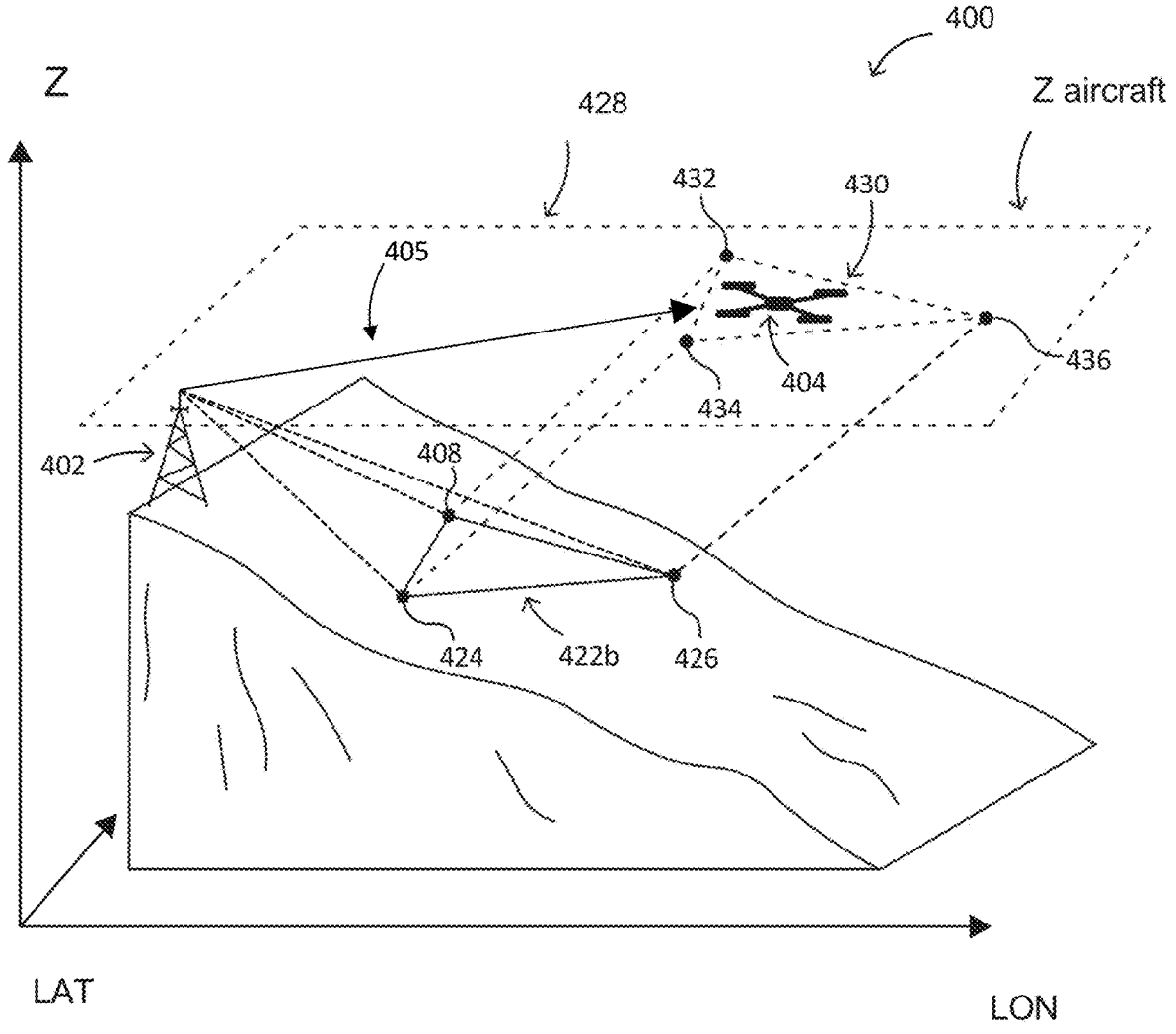
FIG. 4 illustrates a simulated intersection between an aircraft and a projection of a geofence representative of a reflection pattern of signals transmitted by a ground transceiver according to one or more examples of the disclosure.
Figure 5:
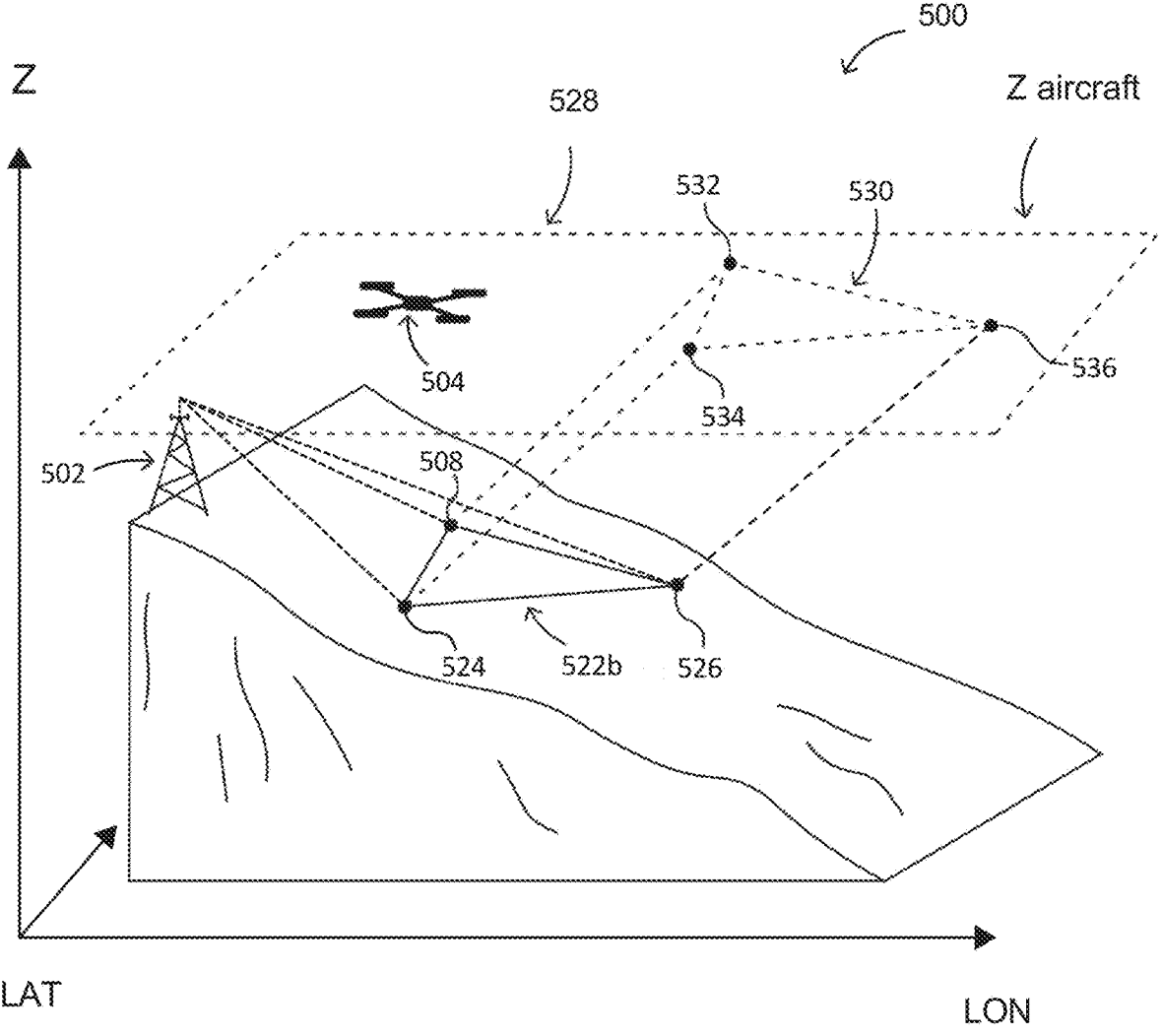
FIG. 5 illustrates a lack of a simulated intersection between an aircraft and a projection of a geofence representative of a reflection pattern of signals transmitted by a ground transceiver according to one or more examples of the disclosure.

In some examples, a ground transceiver 102 determines path loss based upon a simulation of potential intersections between an aircraft traveling in accordance with a flight plan and signals reflecting from the surface of the aircraft's environment. In some examples, prospective intersections between reflected signals and the aircraft are determined based upon the angle of ray reflections off of planar surfaces described with reference to FIG. 3. FIGS. 4 and 5, for example, illustrate an example of a prospective intersection between signals propagating from the ground transceiver 102, that are simulated based upon projections of the planar surfaces described with reference to FIG. 3.

FIG. 4 illustrates an example of a simulated intersection between an aircraft traveling in accordance with a flight plan and a projection of a geofence representative of a reflection pattern of one or more signals transmitted by a ground transceiver. For example, as described further with reference to FIG. 3, a ground transceiver 402 and/or the common controller can determine a planar surface 422b relative to the environment that has an orientation defined by the elevation of vertices of the planar surface. In some examples, the orientation is determined based on an elevations of location 408, location 424, and location 426. It is understood that planar surface 422b is merely exemplary, and the dimensions, spatial profile, dimensionality, and other characteristics of planar surface 422b can be contemplated without departing from the scope of the disclosure. For example, the planar surface 422b boundary can be triangular, rectangular, polygonal, elliptical, can be a three-dimensional surface or contour (e.g., a three-dimensional spline), and/or can be asymmetric relative to one or more axes of the planar surface 422b. In some examples, a flight plan includes a planned route of an aircraft 404, including location information (e.g., latitude, longitude, and/or altitude) of the aircraft 404 at a plurality of times during its planned route. In FIG. 4, a ground transceiver 402 determines aircraft 404 will be at an elevation—represented by the z-plane 428—at a first time during its planned flight, and that aircraft 404 will intersect with a projection 430 (a geofence) of the planar surface 422b. For example, the ground transceiver 402 can project the planar surface 422b to the elevation of aircraft 404 (e.g., onto the z-plane 428) in accordance with a predicted angle of reflection between the ground transceiver 402 and the plane defined by the vertices of planar surface 422b to determine a position, scale, and planar surface of projection 430, the angle of reflection described further with reference to FIG. 2. In some examples, when ground transceiver 402 determines that the projection 430 intersects and/or at least partially bounds the planned position of aircraft 404, the ground transceiver 402 performs additional one or more operations to determine signal fading at the exact position of aircraft 404 due to the constructive and destructive interference of the reflected wave 430 and the direct wave. For example, because the projection 430 will indeed intersect the aircraft 404, ground transceiver 402 can perform additional operations to determine a more granular estimation of the signal that will intersect at the position of aircraft 404. For example, the precise signal timing offsets of the direct ray and reflected rays at the exact aircraft location can be estimated for accurately predicting the path loss constructive or destructive combining effects. As another example, the ground transceiver 402 can determine a predicted magnitude, phase, power, and/or a statistical determination of such characteristics of signals that will reach each of the locations 432, 434, and 436. The ground transceiver 402 can interpolate those characteristics to determine the combination (e.g., a predicted magnitude, phase, power, and/or a statistical determination of such characteristics) of signals at the particular location of aircraft 404 illustrated in FIG. 4. Such interpolated characteristics simulate the signals that can reflect from the mid-portion of planar surface 422b at a location between the vertices and reach aircraft 404, thereby providing an estimated contribution of the reflected signals to degradation of the communication link between a ground site and aircraft 404 at its illustrated position.

In some examples, the ground transceiver 402 determines a fading loss corresponding to a plurality of projected planar surfaces. For example, in accordance with a determination that projection 430 intersects and/or bounds the position of aircraft 404, and in accordance with a determination that another projection of another planar surface intersects and/or bounds the same position of aircraft 404 in FIG. 4, the ground transceiver 402 determines a vector combination of a first reflected ray, a second reflected ray, and the direct path ray (e.g., ray 405). As such, the ground transceiver 402 can model a combination and/or superposition of a plurality of reflected signals that, when vector-combined with the direct path (non-reflected) ray, may cause signal fading at a portion or all planned positions of the aircraft 404 traveling in accordance with the flight plan.

In some examples, the ground transceiver 402 does not perform the additional one or more operations to determine signal fading of signals communicated to an aircraft when a planned position does not intersect with and/or is not bound by a projection of a planar surface. FIG. 5 illustrates a lack of a simulated intersection between an aircraft and a projection of a geofence that is representative of a reflection pattern of signals transmitted by a ground transceiver. In particular, aircraft 504 optionally corresponds to a location (e.g., latitude, longitude, and/or altitude) that is not intersecting with and/or bound by a projection 530 of planar surface 522*b*. As such, a ground transceiver 502 can determine that reflected signals corresponding to planar surface 522*b*, such as one or more signals reflecting from the surface of objects and/or the earth's surface at locations 508, 524, and 526, will not intersect with the location of aircraft 504. In some examples, the ground transceiver 502 can determine that the location of aircraft 504 is not subject to signal fading caused by signals reflecting from the planar surface 522*b* bound by locations 508, 524, and 526 due to the lack of intersection and/or bounding of the location of aircraft 504 by projection 530. In some examples, the ground transceiver 502 forgoes performing operations to further model required to determine a contribution of signals that can correspond to projection 530 on signal fading at the location of 504. In some examples, the projection 530 has one or more characteristics similar to or the same as projection 430, location 508, location 524, and location 526 have one or more characteristics similar to or the same as location 408, location 424, and location 426, planar surface 522*b* has one or more characteristics similar to or the same as planar surface 422*b*, and aircraft 504 has one or more characteristics similar to or the same as aircraft 404.

In some examples, a ground transceiver can additionally or alternatively simulate the effect of atmospheric ray bending to the modeled rays and/or signals that are traveling downward from the ground transceiver toward ground objects and/or the surface of the earth, and/or can apply atmospheric ray bending to the modeled rays and/or signals propagating away from the surface of the earth toward an aircraft.

In some examples, each planar surface described with reference to FIG. 3 and/or included in a coverage area of a ground site can be projected upwards to determine a prospective intersection with the aircraft along a planned location included in its flight plan, similar to or the same as described with reference to FIGS. 4-5. In some examples, when a projection of a planar surface will intersect and/or bound a location of the aircraft at a first elevation that is included in a flight plan for the aircraft, the ground transceiver 302 can perform one or more operations to determine an impact of a reflected signal corresponding to the projection of the planar surface on path loss of signals transmitted from the ground transceiver 302 to an aircraft, as described with reference to FIGS. 4-5. For example, the ground transceiver 302 can determine characteristics of a reflected signal intersecting the aircraft at its intersection location with the projection of the planar surface based upon simulated characteristics of reflected signals for one or more vertices of the projection of the planar surface that are simulated to reach the first elevation. Thus, the operations and/or logic described with reference to FIGS. 4-5 can be repeated to determine signal fading for the flight of an aircraft through a coverage area of a ground site.

In some examples, one or more ground-based transceivers are distributed across a given geographic coverage area associated with the environment 100. While the example of FIG. 1 illustrates a ground-based transceiver 102, the number of ground-based transceivers in the network is not so limited and can include any number of transceivers needed to cover all or at least part of the geographic coverage area associated with the environment 100, such as coverage area 120 and/or another area. In one or more examples, ground-based transceiver 102 can include a transmitter for transmitting signals toward aircraft 104 and can include one or more receivers for receiving one or more response signals from one or more aircraft 104 flying through the coverage area 120 of the environment 100. In some examples, the receiver and the transmitter associated with each ground-based transceiver 102 can be co-located in common locations as illustrated in the example of FIG. 1. Additionally or alternatively, the receiver and transmitter associated with a transceiver can be located in different locations within the geographic coverage area of the environment 100. In some examples, multiple receivers can be associated with a common transmitter, and multiple transmitters can be associated with a common receiver.

In one or more examples, each ground-based transceiver 102 can be communicatively coupled to a network controller that coordinates operation of a system of ground-based transceivers. For instance, the controller (e.g., common controller) can coordinate the transmission of one or more signals to the aircraft 104 flying in the coverage area of the environment 100. In one or more examples, the controller can prepare the content of signals communicated to aircraft 104. In some examples, the controller can coordinate broadcast of the signal amongst the ground-based transceivers such that the signals are transmitted to the one or more aircraft flying within the coverage area of the system.

In some examples, the common controller allocates communication resources in accordance with simulations of fading loss. For example, the common controller can optimize or improve the magnitude of transmission power of signal transmissions of ground-based transceivers transmitting information to an aircraft. As an example, when a first location of the aircraft is predicted to be associated with a first level of fading loss, the ground-based transceiver can be configured to transmit information at first one or more signal powers. When the first location is predicted to be associated with a second, relatively greater level of fading loss, the ground-based transceiver can be configured to transmit information at second one or more signals powers (e.g., greater or less than the first one or more signal powers). Additionally or alternatively, the common controller can determine that a particular level or range of power levels will be required to maintain communication between the aircraft while traversing a plurality of locations included in the flight plan, and can configure the ground-based transceivers to transmit signals at the particular level or range of power levels while the aircraft is flying through the plurality of locations.

In some examples, the common controller allocates additional or alternative communication resources in order to ensure a quality communication link with the aircraft. In some examples, the common controller selects time slots in a time-division multiple access system and/or frequency sub-bands in a frequency division multiple access system, and/or spreading codes in a code-division multiple access system in accordance with the fading loss. In some examples, the common controller selects one or more channels or subchannels that the ground-based transceivers will use to transmit information to the aircraft while the aircraft moves in accordance with the flight plan. In some examples, the common controller selects a ground-site (e.g., including one or more ground-based transceivers) that will transmit information to the aircraft dependent upon predicted fading loss. For example, the common controller can configure two ground sites to communicate with the aircraft during a first segment of its flight plan. In such an example, the common controller can select a first or a second ground site of the two ground sites as a primary signal source when signals received from the selected ground site are predicted to present a relatively lower level of fading loss. In addition to the above, the common controller can determine a reserved bandwidth (frequency channel) that may be required to maintain the communication link based upon the predicted fading losses, can determine a position and/or orientation of antennas communicatively coupled to the ground-based transceivers, and/or can determine the application of beam-forming techniques based upon the predicted fading loss. In addition to the above, the common controller can determine whether to apply diversity techniques such as I/Q modulation or a diversity transmitter/antenna to overcome fading and to maintain the communication link based upon the predicted fading losses. It is understood that the above operations, determinations, simulations, and predictions can be performed by the common controller for a plurality of segments of the flight plan of the aircraft, thus proactively allocating communication resources based upon a predicted fading loss for the entirety of the flight plan of the aircraft. Accordingly, the system and methods contemplated herein can improve the efficiency and reliability of aircraft communication based upon simulations of fading loss informed by topography of the aircraft's environment.

FIG. 6 illustrates an example method of determining path loss of signals communicated to an aircraft according to one or more examples of the disclosure. In some examples, a method 600 for estimating two-ray fading in an airspace is performed. In some examples, the method is performed at a common controller. In some examples the elevation map is represented in a database. In some examples, the common controller obtains (602a) an elevation map, wherein the elevation map comprises, positional data corresponding to a plurality of positions within a physical environment of the ground site, and elevation data corresponding to each position of the plurality of positions, wherein the elevation data is based on one or more surface elevations at each position of the plurality of positions within the physical environment of the ground site. In some examples, the common controller determines (602b) a plurality of planar surfaces relative to an average surface of the physical environment including a first planar surface, wherein vertices of the first planar surface correspond to a first set of positions included in the plurality of positions, and the first planar surface has an orientation relative to a surface of the physical environment based on elevation data corresponding to the first set of positions. In some examples, the common controller determines (602c) a plurality of geofences, wherein each geofence of the plurality of geofences corresponds to an upward projection of a planar surface of the plurality of planar surfaces to the altitude of the aircraft. In some examples, the common controller obtains (602d) a flight plan for an aerial vehicle that will travel across the physical environment of the ground site. In some examples, the common controller determines (602e) one or more intersection points between the obtained flight plan and the plurality of geofences, wherein each intersection point corresponds to at least one geofence of the plurality of geofences. In some examples, for each intersection point of the one or more intersection points, the common controller determines (602f) a predicted path loss associated with signals traveling from the ground site to the aerial vehicle, wherein the predicted path loss is based on orientations of at least one planar surface of the plurality of planar surfaces corresponding to each of the at least one geofence, and wherein the predicted path loss is based on a position of the intersection point relative to each of the at least one geofence.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that the details of the operations and/or processes described herein with respect to at least FIGS. 1-5 can be implemented by one or more information processing devices and/or apparatuses described with reference to FIG. 7.

Figure 7:
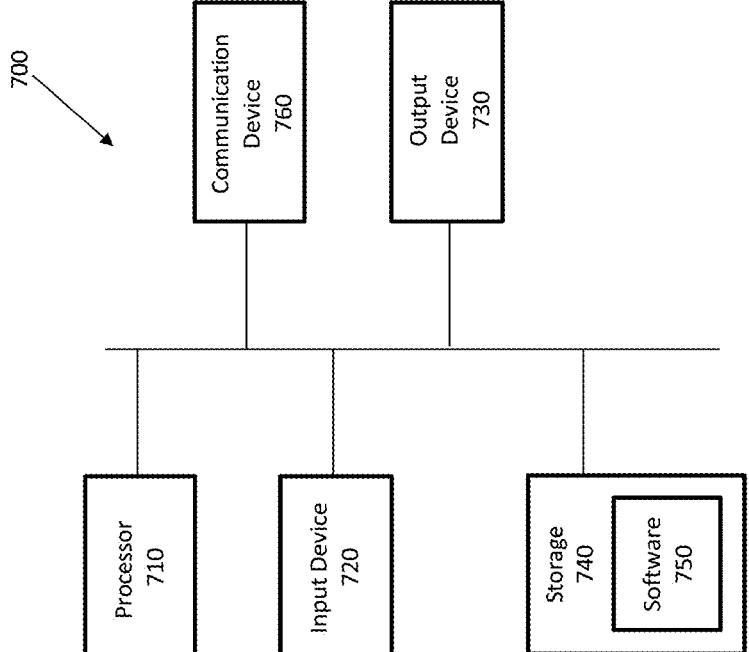
FIG. 7 illustrates an exemplary computing system, according to one or more examples of the disclosure.

FIG. 7 illustrates an exemplary computing system, according to examples of the disclosure. FIG. 7 illustrates an example of a computing system 700, in accordance with some examples system 700 can be a client or a server. As shown in FIG. 7, system 700 can be any suitable type of processor-based system, such as a controller (e.g., a common controller), personal computer, workstation, server, handheld computing device (portable electronic device) such as a phone or tablet, or dedicated device. The system 700 can include, for example, one or more of input device 720, output device 730, one or more processors 710, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 can be any suitable device that provides storage, such as an electrical, magnetic, or optical memory including a RAM, cache, hard drive, removable storage disk, or other non-transitory computer readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above)

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 700 can implement any operating system suitable for operating on the network. Software 750 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

One or more examples of the disclosure are directed to a method for estimating two-ray fading in an airspace. In one or more examples, the method comprises obtaining an elevation map. In one or more examples, the elevation map comprises, locational data corresponding to a plurality of locations within a physical environment of a ground site, and elevation data corresponding to each location of the plurality of locations, wherein the elevation data is based on one or more surface elevations at each location of the plurality of locations within the physical environment of the ground site. In one or more examples, the method comprises determining a plurality of planar surfaces relative to a surface of the physical environment including a first planar surface, wherein vertices of the first planar surface correspond to a first set of locations included in the plurality of locations, and the first planar surface has an orientation relative to a surface of the physical environment based on elevation data corresponding to the first set of locations, one or more examples, the method comprises determining a plurality of geofences, wherein each geofence of the plurality of geofences corresponds to a planar surface of the plurality of planar surfaces. In one or more examples, the method comprises obtaining a flight plan for an aerial vehicle that will travel across the physical environment of the ground site. In one or more examples, the method comprises determining one or more intersection points between the obtained flight plan and the plurality of geofences, wherein each intersection point corresponds to at least one geofence of the plurality of geofences. In one or more examples, the method comprises, for each intersection point of the one or more intersection points, determining a predicted path loss associated with signals traveling from the ground site to the aerial vehicle, wherein the predicted path loss is based on orientations of at least one planar surface of the plurality of planar surfaces corresponding to each of the at least one geofence, and wherein the predicted path loss is based on a location of the intersection point relative to each of the at least one geofence.

Additionally or alternatively, in one or more examples, the method further comprises transmitting one or more signals from the ground site to the aerial vehicle, and a power level of the one or more signals is based on the predicted path loss for each of the intersection points of the one or more intersection points.

Additionally or alternatively, in one or more examples, the method further comprises allocating communication resources based on the predicted path loss for each of the intersection points of the one or more intersection points.

Additionally or alternatively, in one or more examples, the plurality of locations are each associated with a geographic coordinate and an elevation.

Additionally or alternatively, in one or more examples, determining the plurality of planar surfaces includes, in accordance with a determination that a first location included in the plurality of the locations included in the elevation map is within a line-of-sight of the ground site, determining a second planar surface based on the first location, and in accordance with a determination that the first location is not within the line-of-sight of the ground site, forgoing the determining of the second planar surface.

Additionally or alternatively, in one or more examples, a first location included in the first set of locations is adjacent to a second location included in the first set of locations, wherein the first location is adjacent to a third location included in the first set of locations, and wherein the first planar surface corresponds to the first location, second location, and third location.

Additionally or alternatively, in one or more examples, the first planar surface corresponds to a triangle or any other 2-D shape such that adjacent planar surfaces may create an extended 3-D surface approximation without forming any gaps between the adjacent planar surfaces.

Additionally or alternatively, in one or more examples, the first planar surface corresponds to a three-dimensional spline.

Additionally or alternatively, in one or more examples, determining the plurality of geofences includes determining a first geofence, and wherein determining the first geofence includes projecting the first planar surface to one or more elevations that the aerial vehicle will assume while traveling in accordance with the obtained flight plan.

Additionally or alternatively, in one or more examples, the one or more intersection points includes a first intersection point, wherein the vertices of the first geofence intersect with or bound a predicted location of the aerial vehicle, and wherein a predicted path loss associated with the first intersection point is based upon a plurality of predicted path losses corresponding to the vertices of the first geofence.

Additionally or alternatively, in one or more examples, the plurality of planar surfaces include a second planar surface that has an orientation relative to the surface of the physical environment based upon elevation data corresponding to one or more vertices of the second planar surface.

Additionally or alternatively, in one or more examples, determining the plurality of geofences further includes determining a second geofence, and wherein determining the second geofence includes projecting the second planar surface to one or more elevations that the aerial vehicle will assume while traveling in accordance with the obtained flight plan.

Additionally or alternatively, in one or more examples, the one or more intersection points includes a first intersection point associated with a first elevation of the aerial vehicle, and a predicted path loss associated with the first intersection point is based upon predicted path losses corresponding to the vertices of the first geofence and vertices of the second geofence.

Additionally or alternatively, in one or more examples, the vertices of the first geofence intersect with or bound a predicted location of the aerial vehicle, vertices of the second geofence intersect with or bound the predicted location of the aerial vehicle, and a predicted path loss associated with the first intersection point is based upon a plurality of predicted path losses corresponding to the vertices of the first geofence and corresponding to the vertices of the second geofence.

One or more examples of the disclosure are directed a non-transitory computer readable storage medium storing one or more programs for estimating two-ray fading in an airspace, for execution by one or more processors of an electronic device that when executed by the device, cause the device to obtain an elevation map. In one or more examples, the elevation map comprises locational data corresponding to a plurality of locations within a physical environment of the ground site, and elevation data corresponding to each location of the plurality of locations, wherein the elevation data is based on one or more surface elevations at each location of the plurality of locations within the physical environment of the ground site. In one or more examples, the one or more programs when executed by the device cause the device to determine a plurality of planar surfaces relative to a surface of the physical environment including a first planar surface, wherein vertices of the first planar surface correspond to a first set of locations included in the plurality of locations, and the first planar surface has an orientation relative to a surface of the physical environment based on elevation data corresponding to the first set of locations, determine a plurality of geofences, wherein each geofence of the plurality of geofences corresponds to a planar surface of the plurality of planar surfaces, obtain a flight plan for an aerial vehicle that will travel across the physical environment of the ground site, determine one or more intersection points between the obtained flight plan and the plurality of geofences, wherein each intersection point corresponds to at least one geofence of the plurality of geofences, and for each intersection point of the one or more intersection points, determine a predicted path loss associated with signals traveling from the ground site to the aerial vehicle, wherein the predicted path loss is based on orientations of at least one planar surface of the plurality of planar surfaces corresponding to each of the at least one geofence, and wherein the predicted path loss is based on a location of the intersection point relative to each of the at least one geofence.

One or more examples of the disclosure are directed an electronic device configured to estimate two-ray fading in an airspace, the electronic device comprising a memory and one or more processors. In one or more examples, the memory stores one or more programs that when executed by the one or more processors, cause the one or more processors to, obtain an elevation map. In one or more examples, the elevation map includes, locational data corresponding to a plurality of locations within a physical environment of the ground site, and elevation data corresponding to each location of the plurality of locations, wherein the elevation data is based on one or more surface elevations at each location of the plurality of locations within the physical environment of the ground site. In one or more examples, the electronic device is further configured to determine a plurality of planar surfaces relative to a surface of the physical environment including a first planar surface, wherein vertices of the first planar surface correspond to a first set of locations included in the plurality of locations, and the first planar surface has an orientation relative to a surface of the physical environment based on elevation data corresponding to the first set of locations, determine a plurality of geofences, wherein each geofence of the plurality of geofences corresponds to a planar surface of the plurality of planar surfaces, obtain a flight plan for an aerial vehicle that will travel across the physical environment of the ground site, determine one or more intersection points between the obtained flight plan and the plurality of geofences, wherein each intersection point corresponds to at least one geofence of the plurality of geofences, and for each intersection point of the one or more intersection points, determine a predicted 2-ray fading loss associated with signals traveling from the ground site to the aerial vehicle, wherein the predicted 2-ray fading loss is based on orientations of at least one planar surface of the plurality of planar surfaces corresponding to each of the at least one geofence, and wherein the predicted 2-ray fading loss is based on a location of the intersection point relative to each of the at least one geofence.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated. For the purpose of clarity and a concise description, features are described herein as part of the same or separate examples; however, it will be appreciated that the scope of the disclosure includes examples having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for estimating two-ray fading in an airspace, the method comprising:

obtaining an elevation map, wherein the elevation map comprises:

locational data corresponding to a plurality of locations within a physical environment of a ground site, and elevation data corresponding to each location of the plurality of locations, wherein the elevation data is based on one or more surface elevations at each location of the plurality of locations within the physical environment of the ground site;

determining a plurality of planar surfaces relative to a surface of the physical environment including a first planar surface, wherein vertices of the first planar surface correspond to a first set of locations included in the plurality of locations, and the first planar surface has an orientation relative to a surface of the physical environment based on elevation data corresponding to the first set of locations;

determining a plurality of geofences, wherein each geofence of the plurality of geofences corresponds to a planar surface of the plurality of planar surfaces;

obtaining a flight plan for an aerial vehicle that will travel across the physical environment of the ground site;

determining one or more intersection points between the obtained flight plan and the plurality of geofences, wherein each intersection point corresponds to at least one geofence of the plurality of geofences; and for each intersection point of the one or more intersection points, determining a predicted path loss associated with signals traveling from the ground site to the aerial vehicle, wherein the predicted path loss is based on orientations of at least one planar surface of the plurality of planar surfaces corresponding to each of the at least one geofence, and wherein the predicted path loss is based on a location of the intersection point relative to each of the at least one geofence.

2. The method of claim 1, further comprising:

transmitting one or more signals from the ground site to the aerial vehicle, wherein a power level of the one or more signals is based on the predicted path loss for each of the intersection points of the one or more intersection points.

3. The method of claim 1, further comprising:

allocating communication resources based on the predicted path loss for each of the intersection points of the one or more intersection points.

4. The method of claim 1, wherein the plurality of locations are each associated with a geographic coordinate and an elevation.

5. The method of claim 1, wherein determining the plurality of planar surfaces includes:

in accordance with a determination that a first location included in the plurality of the locations included in the elevation data is within a line-of-sight of the ground site, determining a second planar surface based on the first location, and in accordance with a determination that the first location is not within the line-of-sight of the ground site, forgoing the determining of the second planar surface.

6. The method of claim 1, wherein a first location included in the first set of locations is adjacent to a second location included in the first set of locations, wherein the first location is adjacent to a third location included in the first set of locations, and wherein the first planar surface corresponds to the first location, second location, and third location.

7. The method of claim 6, wherein the first planar surface corresponds to a triangle or any other two-dimensional shape such that adjacent planar surfaces create an extended three-dimensional surface approximation.

8. The method of claim 1, wherein determining the plurality of geofences includes determining a first geofence, and wherein determining the first geofence includes projecting the first planar surface to one or more elevations that the aerial vehicle will assume while traveling in accordance with the obtained flight plan.

9. The method of claim 8, wherein the projecting the first planar surface includes calculating a reflection angle of a ray from the ground site, and projecting a simulated reflection of the ray to one or more vertices of the planar surfaces.

10. The method of claim 8, wherein the one or more intersection points includes a first intersection point, wherein the vertices of the first geofence intersect with or bound a predicted location of the aerial vehicle, and wherein a predicted path loss associated with the first intersection point is based upon a plurality of predicted path losses corresponding to the vertices of the first geofence.

11. The method of claim 8, wherein the plurality of planar surfaces include a second planar surface that has an orientation relative to the surface of the physical environment based upon elevation data corresponding to one or more vertices of the second planar surface.

12. The method of claim 11, wherein determining the plurality of geofences further includes determining a second geofence, and wherein determining the second geofence includes projecting the second planar surface to one or more elevations that the aerial vehicle will assume while traveling in accordance with the obtained flight plan.

13. The method of claim 12, wherein the one or more intersection points includes a first intersection point associated with a first elevation of the aerial vehicle, and a predicted path loss associated with the first intersection point is based upon predicted path losses corresponding to the vertices of the first geofence and vertices of the second geofence.

14. The method of claim 13, wherein:

the vertices of the first geofence intersect with or bound a predicted location of the aerial vehicle, vertices of the second geofence intersect with or bound the predicted location of the aerial vehicle, and a predicted path loss associated with the first intersection point is based upon a plurality of predicted path losses corresponding to the vertices of the first geofence and corresponding to the vertices of the second geofence.

15. A non-transitory computer readable storage medium storing one or more programs for estimating two-ray fading in an airspace, for execution by one or more processors of an electronic device that when executed by the electronic device, cause the electronic device to:

obtain an elevation map, wherein the elevation map comprises:

locational data corresponding to a plurality of locations within a physical environment of a ground site, and elevation data corresponding to each location of the plurality of locations, wherein the elevation data is based on one or more surface elevations at each location of the plurality of locations within the physical environment of the ground site;

determine a plurality of planar surfaces relative to a surface of the physical environment including a first planar surface, wherein vertices of the first planar surface correspond to a first set of locations included in the plurality of locations, and the first planar surface has an orientation relative to a surface of the physical environment based on elevation data corresponding to the first set of locations;

determine a plurality of geofences, wherein each geofence of the plurality of geofences corresponds to a planar surface of the plurality of planar surfaces;

obtain a flight plan for an aerial vehicle that will travel across the physical environment of the ground site;

determine one or more intersection points between the obtained flight plan and the plurality of geofences, wherein each intersection point corresponds to at least one geofence of the plurality of geofences; and for each intersection point of the one or more intersection points, determine a predicted path loss associated with signals traveling from the ground site to the aerial vehicle, wherein the predicted path loss is based on orientations of at least one planar surface of the plurality of planar surfaces corresponding to each of the at least one geofence, and wherein the predicted path loss is based on a location of the intersection point relative to each of the at least one geofence.

16. An electronic device configured to estimate fading in an airspace, the electronic device comprising:

a memory; and one or more processors;

wherein the memory stores one or more programs that when executed by the one or more processors, cause the one or more processors to:

obtain an elevation map, wherein the elevation map comprises:

elevation data corresponding to each location of the plurality of locations, wherein the elevation data is based on one or more surface elevations at each location of the plurality of locations within the physical environment of the ground site;

determine a plurality of planar surfaces relative to a surface of the physical environment including a first planar surface, wherein vertices of the first planar surface correspond to a first set of locations included in the plurality of locations, and the first planar surface has an orientation relative to a surface of the physical environment based on elevation data corresponding to the first set of locations;

determine a plurality of geofences, wherein each geofence of the plurality of geofences corresponds to a planar surface of the plurality of planar surfaces;

obtain a flight plan for an aerial vehicle that will travel across the physical environment of the ground site;

determine one or more intersection points between the obtained flight plan and the plurality of geofences, wherein each intersection point corresponds to at least one geofence of the plurality of geofences; and for each intersection point of the one or more intersection points, determine a predicted 2-ray fading loss associated with signals traveling from the ground site to the aerial vehicle, wherein the predicted 2-ray fading loss is based on orientations of at least one planar surface of the plurality of planar surfaces corresponding to each of the at least one geofence, and wherein the predicted 2-ray fading loss is based on a location of the intersection point relative to each of the at least one geofence.

* * * * *